(12) United States Patent
Takekawa

(10) Patent No.: US 10,788,097 B2
(45) Date of Patent: Sep. 29, 2020

(54) FRICTION DAMPER

(71) Applicant: Toyota Jidosha Kabushiki Kaisha, Toyota-shi (JP)

(72) Inventor: Hiroshi Takekawa, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 318 days.

(21) Appl. No.: 15/896,656

(22) Filed: Feb. 14, 2018

(65) Prior Publication Data

US 2018/0238418 A1    Aug. 23, 2018

(30) Foreign Application Priority Data

Feb. 21, 2017  (JP) ................ 2017-030261

(51) Int. Cl.
*F16F 15/129* (2006.01)
*F16F 15/12* (2006.01)
*F16D 1/10* (2006.01)

(52) U.S. Cl.
CPC ........ *F16F 15/129* (2013.01); *F16F 15/1201* (2013.01); *F16D 2001/103* (2013.01); *Y02T 10/6239* (2013.01); *Y10S 277/912* (2013.01); *Y10T 403/7026* (2015.01); *Y10T 403/7028* (2015.01)

(58) Field of Classification Search
CPC .. F16F 15/129; F16F 15/1201; F16F 15/1292; F16F 1/371; Y10S 277/912; F16D 2001/103; F16D 3/12; Y10T 403/7026; Y10T 403/7028; Y02T 10/6239; H02K 7/10; B60K 6/445; B60K 6/40

USPC ............. 464/89–91; 403/359.1, 359.2, 359.4
See application file for complete search history.

(56) References Cited

U.S. PATENT DOCUMENTS

| | | | | |
|---|---|---|---|---|
| 3,508,418 A | * | 4/1970 | Jones | F16D 3/06 403/359.2 |
| 6,776,421 B2 | * | 8/2004 | Florence | F16L 39/00 277/912 |
| 10,300,780 B2 | * | 5/2019 | Yokouchi | B60K 6/445 |

FOREIGN PATENT DOCUMENTS

| | | | | |
|---|---|---|---|---|
| FR | 1.135.765 | * | 5/1957 | ..................... 464/89 |
| JP | 11-287310 A | | 10/1999 | |
| JP | 2011-214646 | | 10/2011 | |
| JP | 2016-118249 | | 6/2016 | |

* cited by examiner

*Primary Examiner* — Greg Binda
(74) *Attorney, Agent, or Firm* — Oblon, McClelland, Maier & Neustadt, L.L.P.

(57) ABSTRACT

A friction damper includes a cylindrical core member and a cylindrical elastic body. The core member is disposed between an outer circumferential surface of an inner shaft and an inner circumferential surface of an outer shaft, and is fixed to one of the inner and outer shafts. The elastic body is in compressive contact with the other of the inner and outer shafts, and has an axial length larger than that of the core member. The elastic body includes a portion extending in an axial direction away from the core member and has a thick-walled section which extends in a radial direction away from the core member. The thick-walled section has a larger wall thickness than a section of the elastic body which overlaps the core member in an axial direction of the core member, and is held in pressing contact with the other of the inner and outer shafts.

2 Claims, 6 Drawing Sheets

FRICTION DAMPER

This application claims priority from Japanese Patent Application No. 2017-030261 filed on Feb. 21, 2017, the disclosure of which is herein incorporated by reference in its entirety.

FIELD OF THE INVENTION

The present invention relates a friction damper, and more particularly to a friction damper having a spline fitting portion a tooth butting noise of which is reduced.

BACKGROUND OF THE INVENTION

There is known a friction damper including a cylindrical core member, and a cylindrical elastic body bonded to an inner or outer circumferential surface of the core member. The core member is disposed in an annular space between an outer circumferential surface of an inner shaft and an inner circumferential surface of an outer shaft while the inner and outer shafts are disposed concentrically and spline-fitted, such that the core member is fixed to one of the inner and outer shafts, while the elastic body is disposed in pressing contact with the other of the inner and outer shafts, with compressive deformation of the elastic body. JP-2016-118249A discloses an example of a vehicular power transmitting system which is provided with the inner and outer shafts and in which the friction damper performs a damping function with a friction resistance of the elastic body to sliding contact of the elastic body with the above-indicated other shaft, to reduce a risk of generation of a tooth butting noise in a spline-fitting portion between the inner and outer shafts due to a variation of relative rotation of the inner and outer shafts caused by a variation of an output torque of an engine of a vehicle.

SUMMARY OF THE INVENTION

By the way, such a conventional friction damper as described above is required to have a high degree of rigidity of the elastic body in its circumferential direction, for assuring a sufficiently high degree of friction resistance in its circumferential direction for reducing the risk of generation of the tooth butting noise. To this end, it is considered to form the elastic body with a large wall thickness, for increasing an amount of compressive deformation of the elastic body. However, a mere increase of the wall thickness of the elastic body results in an increase of the rigidity of the elastic body in the radial direction between the inner and outer shafts. The increase of the rigidity of the elastic body in the radial direction between the inner and outer shafts reduces an amount of relative radial displacement of the inner and outer shafts, and causes deterioration of an automatic coaxial centering function to be performed without separation of teeth of the spline-fitting portion away from each other during transmission of a rotary motion between the inner and outer shafts, giving rise to a risk of generation of radial vibrations of the inner and outer shafts due to their concentric misalignment, which radial vibrations have a frequency corresponding to a multiple of rotating speed of the inner and outer shafts.

The present invention was made in view of the background art described above. It is therefore an object of the present invention to provide a friction damper which has a sufficient degree of friction resistance of an elastic body in its circumferential direction, while restricting an amount of increase of rigidity of the elastic body in its radial direction between inner and outer shafts held in spline-fitting with each other.

The object indicated above is achieved according to the following modes of the present invention:

According to a first mode of the invention, there is provided a friction damper comprising a cylindrical core member and a cylindrical elastic body bonded to an inner or outer circumferential surface of the core member, the core member being disposed within an annular space between an outer circumferential surface of an inner shaft and an inner circumferential surface of an outer shaft, which outer and inner circumferential surfaces are held in spline-fitting with each other, the core member being fixed to one of the inner and outer shafts, while the elastic body being disposed in pressing contact with the other of the inner and outer shafts, with compressive deformation of the elastic body, wherein the elastic body has an axial length larger than that of the core member, and includes an extending portion extending in its axial direction away from the core member, and wherein the extending portion of the elastic body has a thick-walled section which extends in a radial direction of the elastic body away from the core member and has a larger wall thickness than a section of the elastic body which overlaps the core member in an axial direction of the core member, the thick-walled section being held in pressing contact with the above-indicated other of the inner and outer shafts.

According to a second mode of the invention, the friction damper according to the first mode of the invention is configured such that the thick-walled section of the elastic body is formed in an axial end section of the extending portion remote from the core member, and a portion of the elastic body other than the thick-walled section has a constant thickness.

According to a third mode of the invention, the friction damper according to the first or second mode of the invention is provided in a vehicular power transmitting system which is connected to an engine and a motor/generator of a vehicle, and which is provided with the inner shaft and the outer shaft, wherein one of the inner and outer shafts is a rotary shaft to which a rotary motion of the engine is transmitted, while the other of the inner and outer shafts is a rotor shaft of the motor/generator.

In the friction damper according to the first mode of the invention, the elastic body has the axial length larger than that of the core member, and includes the extending portion which extends in its axial direction away from the core member and which has the thick-walled section, so that it is possible to not only restrict an amount of increase of rigidity of an area between the inner and outer shafts in its radial direction as a result of compressive deformation of the thick-walled section, but also increase the rigidity of the area between the inner and outer shafts in its circumferential direction owing to its compressive deformation, thereby assuring a sufficient degree of friction resistance of the thick-walled section. Namely, in the absence of the core member in an axial region of the elastic body in which the thick-walled section is located, there is formed a radial gap between the above-indicated other of the inner and outer shafts and the inner circumferential surface of the extending portion in which the core member does not exist, so that the thick-walled section subjected to the compressive deformation is permitted to undergo bending deformation so as to escape into the radial gap, whereby the amount of increase of the rigidity of the area in the radial direction between the inner and outer shafts is restricted, and at the same time the rigidity of the area is increased as a result of its compressive deformation to as to be extruded into the radial gap, which results in an increase or a decrease of its diameter, whereby the friction resistance of the thick-walled section in its circumferential direction is increased. The restriction of the amount of increase of the rigidity of the area in the radial direction between the inner and outer shafts makes it possible to reduce a risk of deterioration of a coaxial centering function of a spline-fitting portion for coaxial alignment of the inner and outer shafts with each other, which coaxial centering function is performed without separation of spline teeth of the inner and outer shafts away from each other during transmission of a rotary motion between the inner and outer shafts, thereby reducing a risk of generation of radial vibrations of the inner and outer shafts due to their concentric misalignment, and increasing the rigidity of the elastic body and its friction resistance in the circumferential direction, so that the increased friction resistance provides a damping effect for reducing a risk of generation of a tooth butting noise in the spline-fitting portion due to a variation of relative rotation of the inner and outer shafts.

According to the second mode of the invention, the thick-walled section of the elastic body is formed in the axial end section of the extending portion remote from the core member, and the portion of the elastic body other than the thick-walled section has a constant thickness. Accordingly, the friction damper can be given the above-described advantages, by suitably determining the thickness of the thick-walled section, for instance. In other words, a mere adjustment of the wall thickness of the thick-walled section permits not only easy reduction of the risk of generation of the radial vibrations owing to the above-described coaxial centering function of the spline-fitting portion, but also easy reduction of the risk of generation of the tooth butting noise.

According to the third mode of the invention, the friction damper is provided in the vehicular power transmitting system of the vehicle provided with the engine and the motor/generator, wherein the rotary shaft to which the rotary motion of the engine is transmitted and the rotor shaft of the motor/generator are provided as one and the other of the inner and outer shafts, and the friction damper is disposed in an annular space between the inner rotary shaft and the outer rotor shaft. Accordingly, it is possible to not only reduce a risk of deterioration of the coaxial centering function of the spline-fitting portion to be performed without separation of the teeth away from each other during transmission of the rotary motion between the inner rotary shaft and the outer rotor shaft, but also adequately reduce the risk of generation of the tooth butting noise due to repeated alternate separation and abutment of the teeth of the spline-fitting portion away from and against each other due to a variation of the output torque of the engine while an output torque of the motor/generator is zero.

DETAILED DESCRIPTION OF PREFERRED EMBODIMENTS

Figure 1:
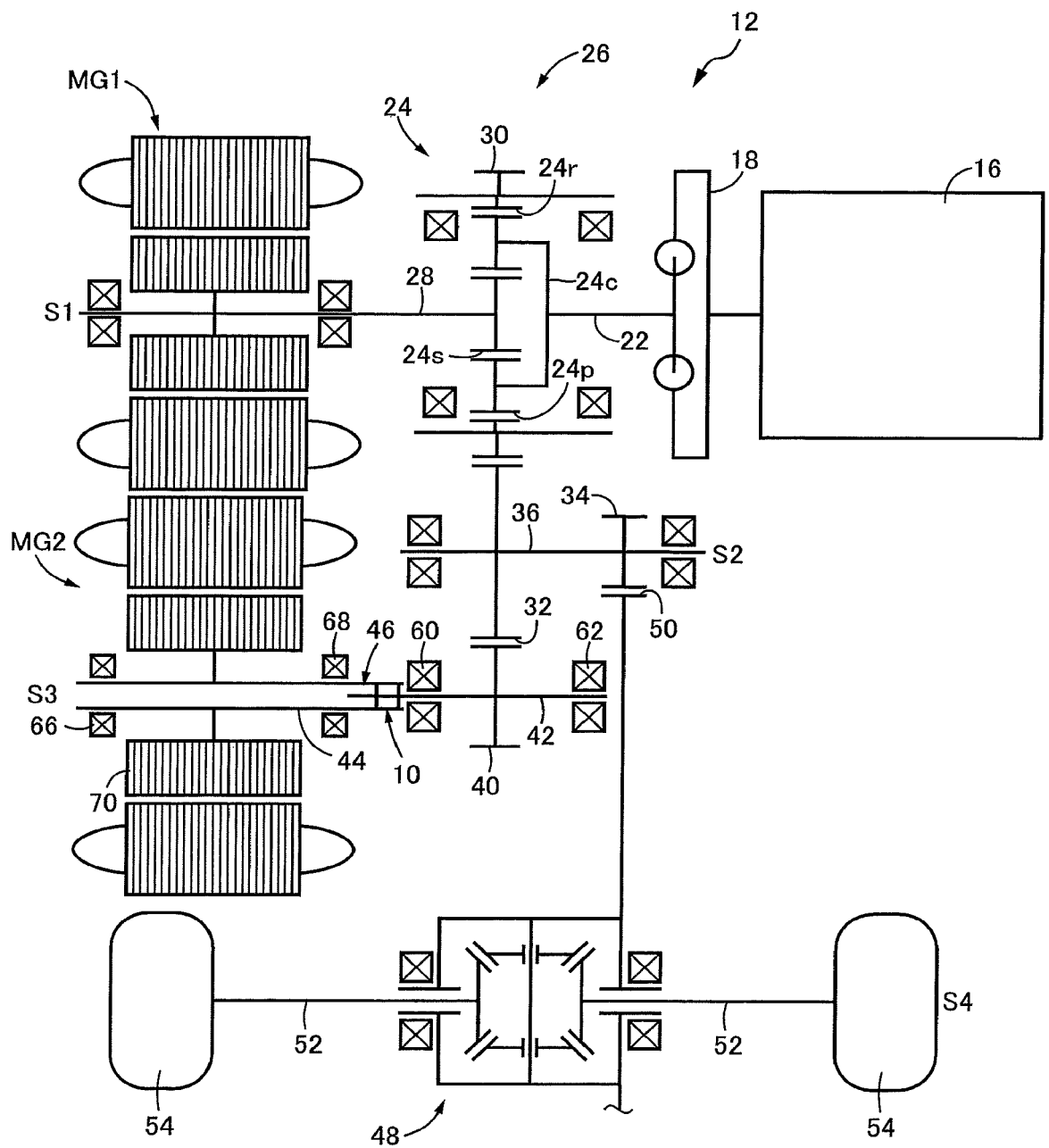
FIG. 1 is a schematic view showing an example of a vehicular power transmitting system provided with a friction damper according to one embodiment of this invention.

While the friction damper according to the present invention is provided in a vehicular power transmitting system, for example, the friction damper may be provided in any other power transmitting system. The elastic body of the friction damper is preferably formed of a rubber material. However, a synthetic resin or any other material having a suitable degree of elasticity may be used for the elastic body. The core member of the friction damper is preferably formed of a metallic material. However, any other material having a suitable degree of strength may be used for the core member. The core member is fixed to one of the inner and outer shafts, by press fitting, welding, or bonding with an adhesive, for example. Generally, the elastic body is formed integrally with the core member, by an insert-molding process, for example, and bonded to the inner or outer circumferential surface of the core member. However, the elastic body which is formed separately from the core member may be integrally bonded to the core member with an adhesive, for instance. Where the elastic body is bonded to the outer circumferential surface of the core member, the core member is fixed to the outer circumferential surface of the inner shaft, while the elastic body is press-fitted in pressing contact with the inner circumferential surface of the outer shaft, with compressive deformation of the elastic body. Where the elastic body is bonded to the inner circumferential surface of the core member, the core member is fixed to the inner circumferential surface of the outer shaft, while the elastic body is press-fitted in pressing contract with the outer circumferential surface of the inner shaft, with compressive deformation of the elastic body.

The elastic body has an extending portion extending in its axial direction away from the core member, and the extending portion includes a thick-walled section in at least its axial end section remote from the core member. A portion of the elastic body other than the thick-walled section may have a constant wall thickness. An entirety of the extending portion may be a thick-walled portion having a larger wall thickness than the other portion of the elastic body which overlaps the core member in its axial direction. This other portion need not have a constant wall thickness over its entire axial length. The elastic body having one extending portion which includes the thick-walled section in at least its axial end section remote from the core member is formed in pressing contact with the core member, and the elastic body and the core member are assembled with respect to the inner and outer shafts, such that the extending portion extends in the axial direction away from the core member. Alternatively, the elastic body having two extending portions including respective thick-walled sections at its respective opposite end portions is formed in pressing contact with the core member, and the elastic body and the core member are assembled with respect to the inner and outer shafts, such that the two extending portions extend in the opposite axial directions away from the core member. Where the elastic body has only one extending portion extending in one axial direction away from the core member, the elastic body and the core member are axially moved relative to the inner and outer shafts, for assembling with respect to the inner and outer shafts, such that the axial end section of the extending portion in which the thick-walled section is formed is located on the trailing side as seen in the axial direction of movement of the elastic body and the core member, so that the thick-walled section is located on the trailing side, whereby the inner and outer shafts can be easily spline-fitted with respect to each other. However, the elastic body and the core member may be axially moved relative to the inner and outer shafts such that the axial end section in which the thick-walled section is formed is located on the leading side as seen in the axial direction of movement of the elastic body and the core member. The thick-walled section preferably has a triangular cross sectional shape having an apex at its radially outermost edge. However, the thick-walled section may have any other cross sectional shape such as a trapezoidal shape. For easier press-fitting of the elastic body with respect to one of the inner and outer shafts, it is preferable that the thick-walled section has a taper surface on its front side as seen in the axial direction of movement of the elastic body for press-fitting with respect to one of the inner and outer shafts.

For example, the friction damper according to the present invention is disposed near a spline-fitting portion between inner and outer shafts, one of which is a rotary shaft to which a rotary motion of an engine is transmitted, and the other of which is a rotor shaft of a motor/generator. However, the friction damper may be disposed for any other spline-fitting portion. Namely, the friction damper of the present invention may be provided not only for reducing a risk of generation of a tooth butting noise in the spline-fitting portion due to repeated alternate separation and abutment of teeth away from each other and against each other which is caused by a variation of the output torque of the engine when the output torque of the motor/generator is zero, but also for reducing the risk of generation of the tooth butting noise in a spline-fitting portion upon reversal of transmission direction of a torque to the spline-fitting portion. The inner and outer shafts described above need not be operatively connected to the engine and the motor/generator, respectively. The above-described motor/generator may be an electric motor, an electric generator, or a motor/generator selectively operable as an electric motor or an electric generator.

Preferred embodiments of this invention will be described in detail by reference to the drawings. It is to be understood that the drawings are simplified and transformed as needed, and do not necessarily accurately represent the dimensions and shapes of various elements of the embodiment.

First Embodiment

Reference is first made to FIG. 1, which is the schematic view showing a vehicular power transmitting system 12 provided with a friction damper 10 according to a first embodiment of this invention. This schematic view is a development view showing a plurality of axes S1-S4 of the power transmitting system 12 in the same plane. The power transmitting system 12 is a transaxle of a hybrid vehicle such as an FF vehicle of a transversely-mounted engine type wherein the axes S1-S4 extend in the transverse or width direction of the vehicle. On the first axis S1, there are disposed an engine 16, a damper device 18 and an input shaft 22 such that the input shaft 22 is connected to the engine 16 through the damper device 18. Coaxially with this first axis S1, there are disposed a planetary gear set 24 of a single-pinion type, and a first motor/generator MG1. The planetary gear set 24 and the first motor/generator MG1 cooperate to function as an electric differential portion 26. The planetary gear set 24 serving as a differential mechanism has a carrier 24c connected to the input shaft 22, a sun gear 24s connected to a rotor shaft 28 of the first motor/generator MG1, and a ring gear 24r formed with an engine output gear 30. The sun gear 24s and the ring gear 24r are held in meshing engagement with a plurality of pinions 24p which are supported by the carrier 24c such that the pinions 24p are freely rotatable.

The first motor/generator MG1 is selectively operated as an electric motor or an electric generator. When the first motor/generator MG1 is operated to function as the electric motor to perform a regenerative operation, a rotating speed of the sun gear 24s is continuously variable so that an operating speed of the engine 16 is continuously varied, and an output of the engine 16 is transmitted from the engine output gear 30. When an output torque of the first motor/generator MG1 is zero, the sun gear 24s is freely rotated, so that the output of the engine 16 is cut off, while a dragging rotary motion of the engine 16 is prevented in a motor drive mode or a coasting run of the vehicle. The engine 16 is an internal combustion engine such as a gasoline or diesel engine, which is operated to generate a drive force by combustion of a fuel, and used as a vehicle drive power source.

On the second axis S2, there is disposed a counter shaft 36 on which a speed reducing large gear 32 and a speed reducing small gear 34 are rotatably mounted. The speed reducing large gear 32 is held in meshing engagement with the engine output gear 30, and a motor output gear 40 disposed on the third axis S3. The motor output gear 40 is mounted on a gear shaft 42 which is operatively connected through a spline fitting portion 46 to a rotor shaft 44 of a second motor/generator MG2 disposed on the third axis S3. The second motor/generator MG2 is selectively operated as an electric motor or an electric generator. The second motor/generator MG2 is also used as the vehicle drive power source when it is operated to function as the electric motor to perform a vehicle driving operation. Thus, the vehicular power transmitting system 12 is used for the hybrid vehicle of a double-axes type wherein the engine 16 and the electric differential portion 26 are disposed on the first axis S1 while the second motor/generator MG2 is disposed on the third axis S3 spaced apart from the first axis S1 in the radial direction.

The speed reducing small gear 34 described above is held in meshing engagement with a differential ring gear 50 of a differential device 48 disposed on the fourth axis S4, so that a drive force is transmitted from the engine 16 and the second motor/generator MG2 to the differential device 48 through the speed reducing small gear 34, and is distributed by the differential device 48 to left and right drive wheels 54 through respective left and right drive shafts 52.

Figure 2:
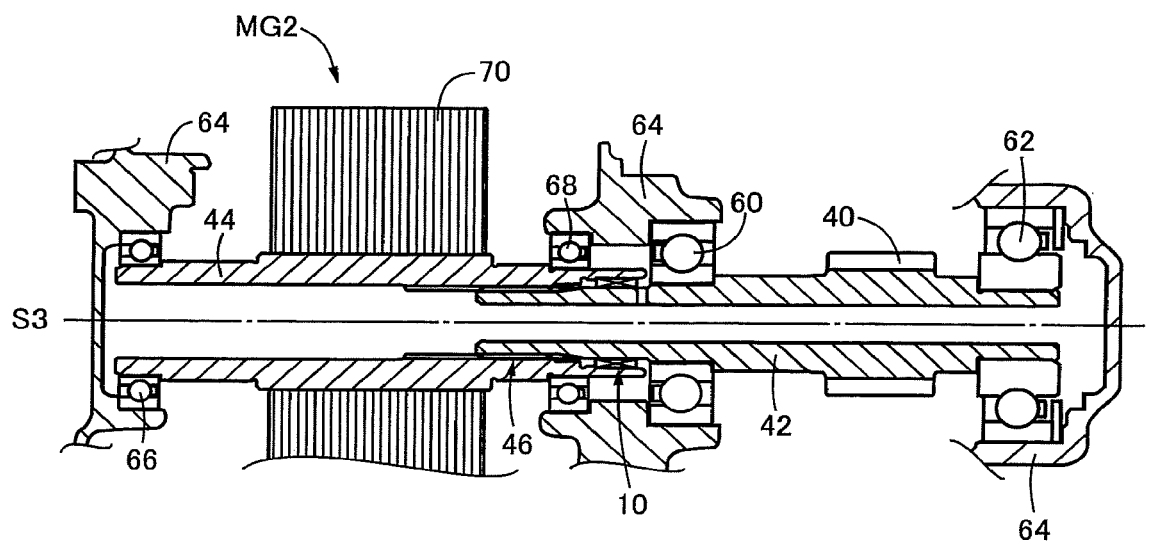
FIG. 2 is a cross sectional view showing in detail a portion of the vehicular power transmitting system of FIG. 1 in which the friction damper is disposed.

FIG. 2 is the cross sectional view showing in detail a portion of the vehicular power transmitting system 12 in which there are disposed the gear shaft 42 and the rotor shaft 44 which are disposed coaxially with each other on the third axis S3. The gear shaft 42 is a cylindrical member which functions as a drive shaft for transmitting drive force of the second motor/generator MG2 to the drive wheels 54 through the counter shaft 36, and to which the drive force of the engine 16 is transmitted through the counter shaft 36 and the motor output gear 40. This gear shaft 42 is supported rotatably about the third axis S3 (i.e. axis of the gear shaft 42), by a casing 64 through a pair of bearings 60 and 62. The rotor shaft 44 is also a cylindrical member which is supported rotatably about the third axis S3, by the casing 64 through a pair of bearings 66 and 68. A rotor 70 of the second motor/generator MG2 is connected to an axially intermediate portion of the rotor shaft 44 such that the rotor 70 and the rotor shaft 44 are rotated together with each other, so that a rotary motion of the second motor/generator MG2 is transmitted to the rotor shaft 44.

Figure 3:
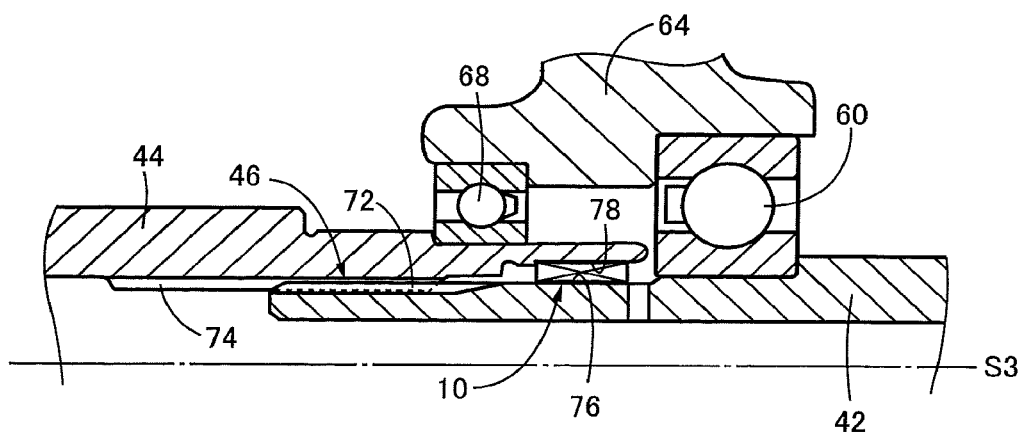
FIG. 3 is an enlarged cross sectional view of the friction damper and its vicinity shown in FIG. 2.

The gear shaft 42 and the rotor shaft 44 are operatively connected to each other through the spline fitting portion 46. FIG. 3 is the enlarged view of the spline fitting portion 46 and its vicinity. An axial end portion of the gear shaft 42 on the side of the second motor/generator MG2 has an outside diameter smaller than an outside diameter of the rotor shaft 44, and is fitted on an inner circumferential surface of the rotor shaft 44. The axial end portion of the gear shaft 42 has an external spline 72 formed on its outer circumferential surface, while an axial end portion of the rotor shaft 44 corresponding to the above-indicated axial end portion of the gear shaft 42 has an internal spline 74 formed on its inner circumferential surface. These external spline 72 and internal spline 74 are held in engagement with each other, and cooperate to form the spline fitting portion 46. The external spline 72 and the internal spline 74 are involute splines having involute teeth capable of performing a coaxial centering function, so that the gear shaft 42 and the rotor shaft 44 are held substantially coaxial with each other without separation of the involute teeth of the splines 72 and 74 away from each other during transmission of a rotary motion from the rotor shaft 44 to the gear shaft 42, namely, when a torque is generated by the second motor/generator MG2. It is noted that the gear shaft 42 having the external spline 72 corresponds to an inner shaft to which a rotary motion of the engine 16 is transmitted, and the rotor shaft 44 having the internal spline 74 corresponds to an outer shaft, while the second motor/generator MG2 operated to rotate the rotor shaft 44 corresponds to a motor/generator.

There exists a gap (backlash) between the external spline 72 and the internal spline 74. Accordingly, there is a risk of generation of a tooth butting noise with repeated alternate separation and abutting contact of the teeth of the external and internal splines 72 and 74 away from each other and with each other, which take place due to rotation of the gear shaft 42 and the rotor shaft 44 relative to each other, which is caused by a variation of the torque of the engine 16 in its explosion stroke. For example, the tooth butting noise is generated when the rotor shaft 44 is rotated by the gear shaft 42 when the rotor shaft 44 is in a non-load state while the torque of the second motor/generator MG2 is substantially zero. To reduce the risk of generation of the tooth butting noise, the friction damper 10 is provided adjacent to the spline fitting portion 46, according to the present embodiment of the invention. That is, the gear shaft 42 has an outer circumferential surface portion 76 spaced apart from its axial end on the side of its external spline 72, while the rotor shaft 44 has an inner circumferential surface portion 78 spaced apart from the internal spline 74 in the direction toward its axial end on the side of the internal spline 74. These outer circumferential surface portion 76 and inner circumferential surface portion 78 are opposed to each other in their radial direction, namely, located at the same position in the direction of the third axis S3, when the gear shaft 42 and the rotor shaft 44 are assembled in engagement with each other. The friction damper 10 is disposed in an annular space formed between the outer circumferential surface portion 76 and the inner circumferential surface portion 78.

Figure 4:
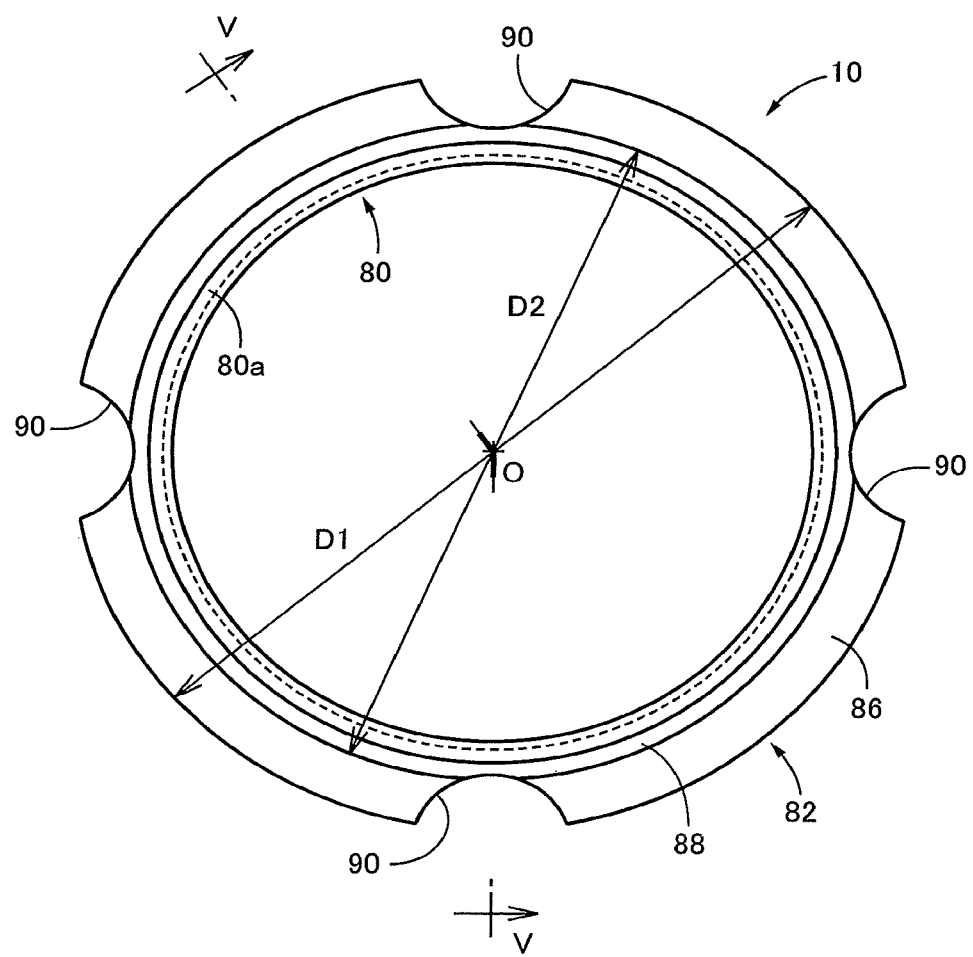
FIG. 4 is a plan view of the friction damper.
Figure 5:
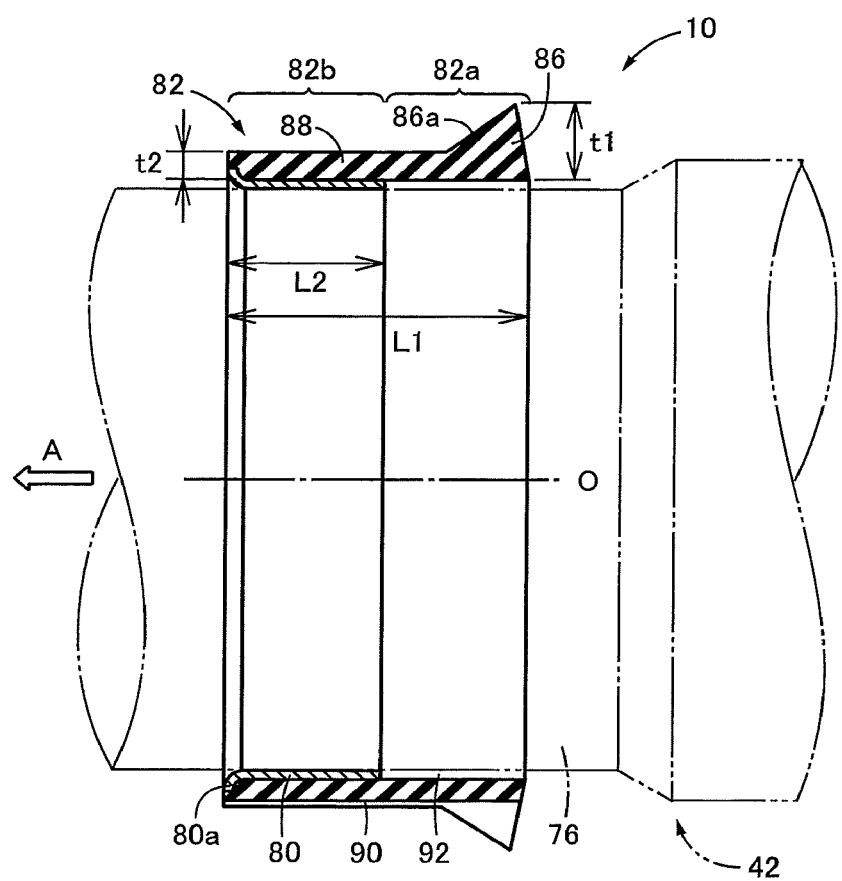
FIG. 5 is a cross sectional view taken in a direction of arrows V-V in FIG. 4.

FIG. 4 is the plan view of the friction damper 10, namely, a view taken in the rightward direction as seen in FIG. 5. FIG. 5 is the cross sectional view taken in the direction of arrows V-V in FIG. 4. This friction damper 10 includes a cylindrical core member 80, and a cylindrical rubber body 82 integrally bonded to an outer circumferential surface of the core member 80. The core member 80 is formed of a metallic material, and is fixedly press-fitted on the outer circumferential surface portion 76 of the gear shaft 42 such that the core member 80 is coaxial with the gear shaft 42, namely, has a center line O in line with the above-indicated third axis S3. The core member 80 has a radially outwardly bent flange 80a in its front end portion on the side of its axial end as seen in a direction A (leftward direction as seen in FIGS. 3 and 5) in which the gear shaft 42 is moved relative to the rotor shaft 44, for spline-fitting with the rotor shaft 44. The flange 80a is bent radially outwardly at its front end. The rubber body 82 is the elastic body and formed into a predetermined shape by an insert-molding process, for example, and is integrally bonded to the outer circumferential surface of the core member 80. The rubber body 82 has an axial length L1 larger than an axial length L2 of the core member 80, and includes a rear extending portion 82a, corresponding said one extending portion, on its axial side remote from the flange 80a, which rear extending portion 82a extends in the rearward direction away from the rear end of the core member 80. The axial length L2 of the core member 80 is selected to be about ⅓ to about ⅔ of the axial length L1 of the rubber body 82. In the present embodiment, the axial length L2 is set to be about ½ of the axial length L1, and the rubber body 82 has a front end located at the flange 80a, so that the rear extending portion 82a extends in the rearward direction away from the rear end of the core member 80, by about a half of the axial length L1.

The rubber body 82 has a front portion 82b which is bonded to the core member 80 and from which the rear extending portion 82a extends. The front portion 82b overlaps the core member 80 in the axial direction of the core member 80. The rear extending portion 82a includes a thick-walled section 86 in its axial end section remote from the core member 80 (i.e. in its axial end section of trailing side regarding inserting (movement) direction A). The thick-walled section 86 has a thickness larger than other portion including the front portion 82b. This thick-walled section 86 extends radially outwardly from the rear extending portion 82a of the rubber body 82, i.e., apart from the core member 80 in view of radial direction, and is held in pressing contact with the inner circumferential surface 78 of the rotor shaft 44 such that a radial gap 92 corresponding to a thickness of the core member 80 is left between an inner circumferential surface of the rear extending portion 82a and the outer circumferential surface 76 of the gear shaft 42. The rubber body 82 has a constant-thickness section 88 which is other than the thick-walled section 86 and which has a substantially constant wall thickness t2. The thick-walled section 86 has a wall thickness larger than the wall thickness t2, and a triangular shape tapered toward the outer circumferential side in axial cross section in a plane including the axis O, and a smallest wall thickness equal to the wall thickness t2, and a largest wall thickness t1. The thick-walled section 86 having the triangular cross sectional shape has a taper surface 86a on its front side as seen in the above-indicated direction A. This taper surface 86a has a taper angle which is small enough to permit comparatively easy press-fitting of the rubber body 82 with the inner circumferential surface 78 of the rotor shaft 44, with compressive deformation of the thick-walled section 86 with the taper surface 86a in pressing contact with the inner circumferential surface 78. The thick-walled section 86 has a largest outside diameter D1 corresponding to its largest wall thickness t1, which largest outside diameter D1 is larger than an outside diameter of the inner circumferential surface 78 of the rotor shaft 44. When the rubber body 82 is press-fitted in pressing contact with the inner circumferential surface 78 of the rotor shaft 44, the thick-walled section 86 is compressed with reduction of its outside diameter. The outside diameter D2 of the constant-thickness section 88 is set to be equal to or slightly smaller than the outside diameter of the inner circumferential surface 78, so that the rubber body 82 can be easily press-fitted in pressing contact with the inner circumferential surface 78, with an axial movement of the rubber body 82 with its constant-thickness section 88 leading in the direction of the axial moment. It is noted that the thick-walled section 86 is not required to have a triangular cross sectional shape, and may have any other cross sectional shape such as a trapezoidal shape.

The compressive deformation of the thick-walled section 86 increases its rigidity, and its resistance to sliding friction with the inner circumferential surface 78 of the rotor shaft 44 in the rotating direction of the rotor shaft 44. This friction resistance of the thick-walled section 86 provides a damping effect to reduce generation of a tooth butting noise as a result of mutual butting of the external spline 72 and the internal spline 74 due to a torque variation of the engine 16 in its explosion stroke. Axial dimension and position, the largest wall thickness t1 (namely, the largest outside diameter D1) and a shape of the thick-walled section 86 are suitably determined by experimentation, for instance, so as to obtain the friction resistance required to reduce the tooth butting noise. The rubber body 82 has a plurality of oil grooves 90 (four oil grooves 90 in the present embodiment) formed in its outer circumferential surface such that the oil grooves 90 extend in the axial direction of the rubber body 82 and are spaced apart from each other in the circumferential direction of the rubber body 82 (about the center line O), so that a lubricant flows through the oil grooves 90, to lubricate an interface between the outer circumferential surface of the rubber 82 and the inner circumferential surface 78 of the rotor shaft 44. It is noted that the shape of the rubber body 82 shown in FIGS. 4 and 5 is the natural shape prior to the compressive deformation of the rubber body 82 as a result of its press-fitting with the rotor shaft 44 in pressing contact with the inner circumferential surface 78.

In the absence of the core member 80 in an axial region of the rubber body 82 in which the thick-walled section 86 is located, there is formed the radial gap 92 between the outer circumferential surface portion 76 of the gear shaft 42 and the inner circumferential surface of the rear extending portion 82a, so that the thick-walled section 86 subjected to the compressive deformation is permitted to undergo bending deformation so as to escape into the radial gap 92. That is, the friction damper 10 according to the present embodiment is configured to permit the thick-walled section 86 to be deformed so as to be extruded into the radial gap 92, with a result of reduction of the outside diameter of the thick-walled section 86. Accordingly, an amount of increase of the rigidity between the gear shaft 42 and the rotor shaft 44 regardless of the compressive deformation of the thick-walled section 86 is restricted to reduce a risk of deterioration of the above-described coaxial centering function of the involute teeth of the spline-fitting portion 46 to be performed without separation of the involute teeth of the external and internal splines 72 and 74 away from each other during transmission of a rotary motion from the rotor shaft 44 to the gear shaft 42. A radial dimension of the radial gap 92 which is selected to be substantially equal to the wall thickness of the core member 80, for example, can be set as desired, according to a forming mold used for the insert-molding of the rubber body 82. It is noted that FIG. 5 shows the friction damper 10 in its natural state prior to press-fitting in pressing contact with the inner circumferential surface 78 of the rotor shaft 44, and that after the compressive deformation of the thick-walled section 86 as a result of the press-fitting of the friction damper 10 in pressing contact with the inner circumferential surface 78, the volume of the radial gap 92 is reduced, or zeroed as a result of contact of the inner circumferential surface of the rear extending portion 82a with the outer circumferential surface 76 of the gear shaft 42.

In the friction damper 10 according to the present embodiment, the rubber body 82 has the axial length L1 larger than the axial length L2 of the core member 80, and includes the rear extending portion 82a which extends in its axial direction away from the core member 80 and which has the thick-walled section 86, so that the radial gap 92 is formed between the rear extending portion 82a and the gear shaft 42. In the presence of the radial gap 92, it is possible to not only restrict the amount of increase of the rigidity of the thick-walled section 86 in the radial direction between the gear shaft 42 and the rotor shaft 44 regardless of the compressive deformation of the thick-walled section 86, but also increase the rigidity of the thick-walled section 86 in the circumferential direction owing to its compressive deformation, thereby assuring a sufficient degree of friction resistance of the thick-walled section 86 with respect to the inner circumferential surface portion 78 of the rotor shaft 44. Further, the restriction of the amount of increase of the rigidity of the thick-walled section 86 in the radial direction between the gear shaft 42 and the rotor shaft 44 makes it possible to reduce the deterioration of the above-described coaxial centering function of the involute teeth of the spline-fitting portion 46 to be performed without separation of the involute teeth of the external and internal splines 72 and 74 away from each other during transmission of a rotary motion from the rotor shaft 44 to the gear shaft 42, thereby reducing a risk of generation of radial vibrations of the gear shaft 42 and the rotor shaft 44 due to their concentric misalignment, and increasing the rigidity of the thick-walled section 86 of the rubber body 82 and its friction resistance in the circumferential direction, so that the increased friction resistance provides a damping effect for reducing a risk of generation of the tooth butting noise in the spline-fitting portion 46 due to a variation of relative rotation of the gear shaft 42 and the rotor shaft 44.

The present embodiment is further configured such that the thick-walled section 86 of the rubber body 82 is formed in the axial end section of the rear extending portion 82a remote from the core member 80, and the portion of the rubber body 82 other than the thick-walled section 86 is the constant-thickness section 88 which has the constant thickness t2. Accordingly, the friction damper 10 can be given the above-described advantages, by suitably determining the largest wall thickness t1 (or the largest outer diameter D1) of the thick-walled section 86, for instance. In other words, a mere adjustment of the largest wall thickness t1 of the thick-walled section 86 permits not only easy reduction of the risk of generation of the tooth butting noise due to repeated alternate separation and abutment of the involute teeth of the spline-fitting portion 46 away from and against each other, but also easy reduction of the risk of generation of the radial vibrations owing to the coaxial centering function of the spline-fitting portion 46 to be performed without separation of the involute teeth away from each other during transmission of a rotary motion from the rotor shaft 44 to the gear shaft 42. The thick-walled section 86 may be modified as needed, in its axial dimension and position, and its shape.

The present embodiment is also configured such that the friction damper 10 is disposed near the spline-fitting portion 46 between the gear shaft 42 to which the rotary motion of the engine 16 is transmitted, and the rotor shaft 44 of the second motor/generator MG2. Accordingly, it is possible to not only reduce a risk of deterioration of the coaxial centering function of the spline-fitting portion 46 to be performed without separation of the teeth away from each other during transmission of the rotary motion between the gear shaft 42 and the rotor shaft 44, but also adequately reduce the risk of generation of the tooth butting noise due to repeated alternate separation and abutment of the teeth of the spline-fitting portion 46 away from and against each other due to a variation of the output torque of the engine 16 while the output torque of the second motor/generator MG2 is zero.

Other embodiments of this invention will be described. It is to be understood that the same reference signs as used in the first embodiment will be used in the following embodiments, to identify the same elements, which will not be described redundantly.

Second Embodiment

Figure 6:
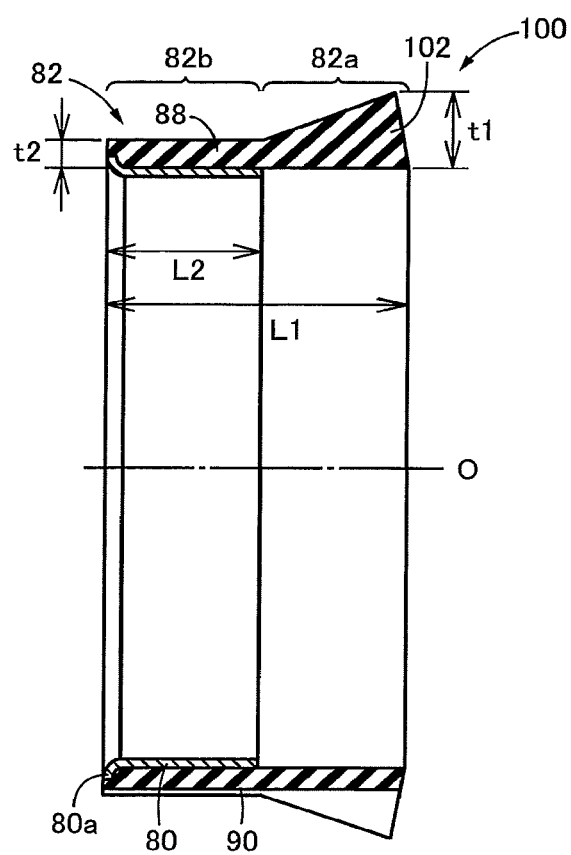
FIG. 6 is a cross sectional view corresponding to that of FIG. 5, showing a friction damper according to another embodiment of this invention.

In the first embodiment, the thick-walled section 86 is provided in a part of the axial length of the rear extending portion 82a of the rubber body 82. In a friction damper 100 according to the present second embodiment shown in FIG. 6, however, a thick-walled section 102 is provided in an entire axial length of the rear extending portion 82a. The thick-walled section 102 has a wall thickness larger than the wall thickness t2 of the constant-thickness section 88. It is noted that the wall thickness t2 of the front portion 82b may be changed within a range not larger than the smallest wall thickness of the thick-walled section 102.

Third Embodiment

In the friction damper 10 according to the first embodiment, the core member 80 is fixedly press-fitted in pressing contact with the outer circumferential surface 76 of the inner shaft in the form of the gear shaft 42. In a friction damper 110 according to the present third embodiment shown in FIG. 7, however, a core member 112 is fixedly press-fitted in pressing contact with the inner circumferential surface 78 of the outer shaft in the form of the rotor shaft 44. In this friction damper 110, the elastic body in the form of a rubber body 114 is bonded to the inner circumferential surface of the core member 112, unlike the rubber body 82 in the first embodiment. The rubber body 114 has an axial length L1 larger than an axial length L2 of the core member 112, and includes a rear extending portion 114a which extends in the rearward direction away from the rear end of the core member 112 as seen in the direction A in which the gear shaft 42 is moved relative to the rotor shaft 44, for spline-fitting with the rotor shaft 44. The rear extending portion 114a has a thick-walled section 116 in its axial end section remote from the core member 112. This thick-walled section 116 extends radially inwardly from the rear extending portion 114a, and has a smallest inside diameter smaller than an outside diameter of the gear shaft 42. When the rubber body 114 is press-fitted on the outer circumferential surface 76 of the gear shaft 42, with compressive deformation and enlargement of an inside diameter of the thick-walled section 116, the rear extending portion 114a is subjected to bending deformation so as to be extruded into an annular gap 118 in which the core member 112 does not exist. This friction damper 110 has substantially the same advantages as the friction dampers 10 and 100 according to the preceding first and second embodiments.

Figure 7:
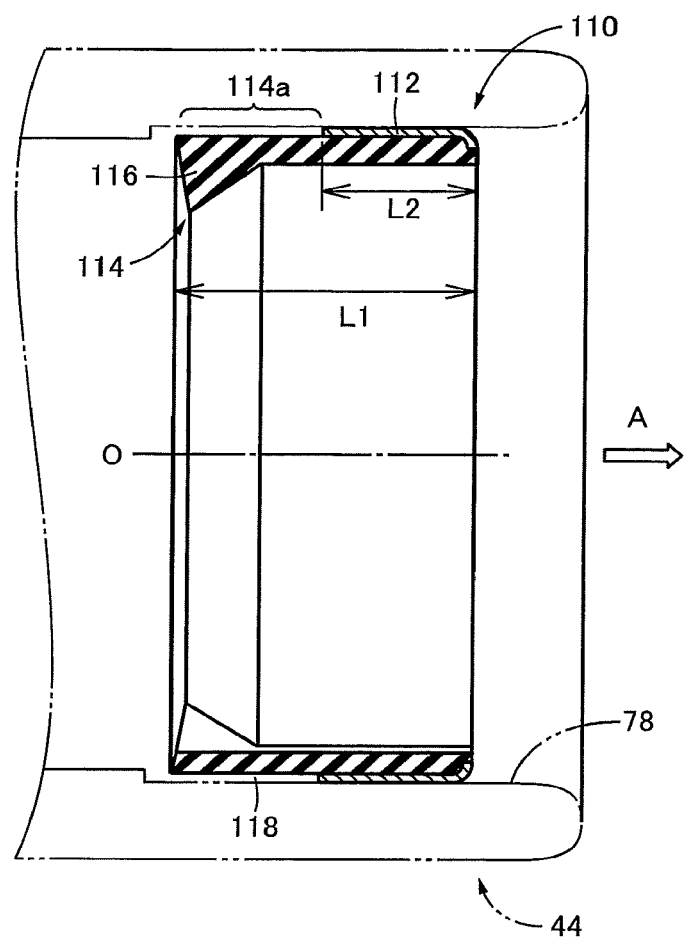
FIG. 7 is a cross sectional view corresponding to that of FIG. 5, showing a friction damper according to a further embodiment of this invention.

The friction damper 110 according to the third embodiment of FIG. 7 is disposed on distal side of the rotor shaft 44, which one side is nearer to the axial end portion of the rotor shaft 44 relative to the spline-fitting portion 46. However, the friction damper 110 may be disposed on axially inner side relative to the spline-fitting portion 46 remote from the above-indicated axial end portion of the rotor shaft 44. In this case, the gear shaft 42 has an extended outer circumferential surface across the-spline-fitting portion 46 such that the outer circumferential surface can press contact with the rubber body 114 of the friction damper 110.

While the preferred embodiments of the invention have been described by reference to the drawings, for illustrative purpose only, it is to be understood that the present invention may be embodied with various other changes and improvements which may occur to those skilled in the art.

NOMENCLATURE OF ELEMENTS 10, 100, 110: Friction damper
12: Vehicular power transmitting system
16: Engine
42: Gear shaft (Inner shaft; Rotary shaft)
44: Rotor shaft (Outer shaft)
46: Spline fitting portion
76: Outer circumferential surface portion
78: Inner circumferential surface portion
80, 112: Core member
82, 114: Rubber body (Elastic body)
82a, 114a: Extending portion
86, 102, 106: Thick-walled section
MG2: Second motor/generator (Motor/generator)
L1, L2: Axial length
t1, t2: Wall thickness

What is claimed is:
1. A friction damper comprising:
a cylindrical core member; and
a cylindrical elastic body bonded to an inner or outer circumferential surface of the core member,
wherein the core member is configured to be disposed within an annular space between an outer circumferential surface of an inner shaft and an inner circumferential surface of an outer shaft, which outer and inner circumferential surfaces are held in spline-fitting with each other, the core member is configured to be fixed to one of the inner and outer shafts, while the elastic body is configured to be disposed in pressing contact with the other of the inner and outer shafts, with compressive deformation of the elastic body,
wherein the elastic body has an axial length larger than that of the core member, and includes an extending portion extending in its axial direction away from the core member,
wherein the extending portion of the elastic body has a thick-walled section which extends in a radial direction of the elastic body away from the core member and has a larger wall thickness than a section of the elastic body which overlaps the core member in an axial direction of the core member, the thick-walled section being held in pressing contact with said other of the inner and outer shafts, and wherein the thick-walled section of the elastic body is formed in an axial end section of the extending portion remote from the core member, and a portion of the elastic body other than the thick-walled section has a constant thickness.

2. The friction damper according to claim 1, which is provided in a vehicular power transmitting system which is connected to an engine and a motor/generator of a vehicle, and which is provided with the inner shaft and the outer shaft, wherein one of the inner and outer shafts is a rotary shaft to which a rotary motion of the engine is transmitted, while the other of the inner and outer shafts is a rotor shaft of the motor/generator.

\* \* \* \* \*